G. B. GRUMAN.
Ice Cutting Machine.

No. 69,338.

Patented Oct. 1, 1867.

Witnesses
Wm Hine
Jos. F. Foote

Inventor
George B Gruman

UNITED STATES PATENT OFFICE.

GEORGE B. GRUMAN, OF RIDGEFIELD, CONNECTICUT.

IMPROVEMENT IN MACHINES FOR CUTTING ICE INTO BLOCKS FOR STORING.

Specification forming part of Letters Patent No. 69,338, dated October 1, 1867.

*To all whom it may concern:*

Be it known that I, GEORGE B. GRUMAN, of the town of Ridgefield, county of Fairfield, and State of Connecticut, have invented a new and useful Machine for Cutting Ice into Blocks from Ponds; and I do hereby declare that the following is a full, clear, and exact description thereof, reference being had to the annexed drawings, making a part of this specification, in which—

Figure 1:
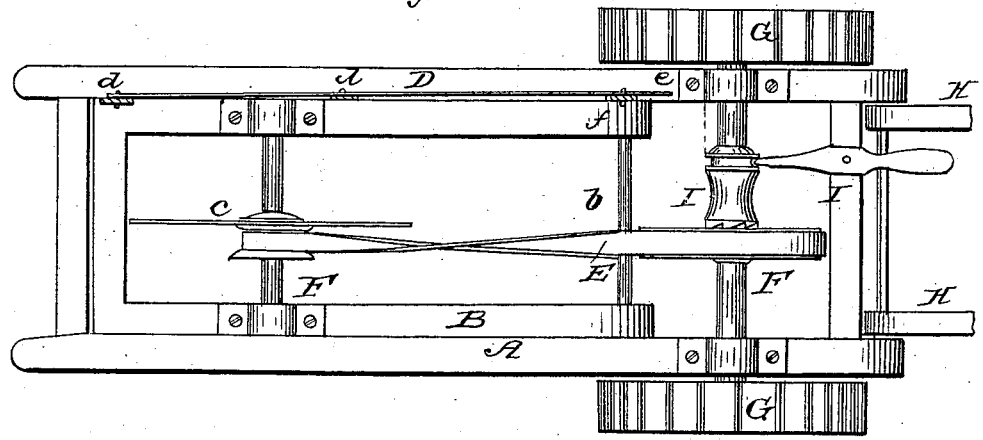
Figure 2:
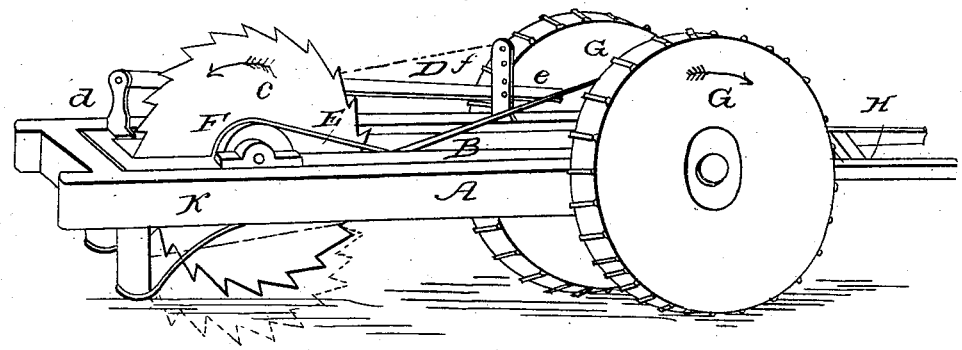

Figure 1 is a perspective side view. Fig. 2 is a plan view.

Letter A is the carriage-frame. B is the saw-frame; C, the circular saw; D, the adjusting-lever to raise and fall the saw-frame B; E, the driving-belt; F F, driving-pulleys; G, the main wheels and shaft; I, the coupling-clutch and lever; H, shafts for the horse.

To enable others skilled in the art to make and use my invention, I will proceed to describe the construction and operation.

I construct the carriage-frame A of the requisite size and strength to receive the necessary machinery for actuating the saw C. Within this frame A, I form the saw-frame B, one end of which works on the shaft b, and on the other end is the circular saw C. This frame is made to vibrate up and down by means of the lever D, which is intended to regulate the distance or depth of the cut or channel in the ice. This lever D is pivoted on the uprights d d, and is operated by the handle e, regulated by the holes or notches in the upright f. The main driving-wheels G, I make of the requisite size and diameter, with a broad periphery, with transverse projecting teeth or studs, to pierce the surface of the ice, and hold on to the same with sufficient firmness to cause the circular saw to revolve and cut the ice as it travels along. The driving-belt I make of either leather or a flat-link chain, or their equivalents, or may use gearing. The clutch and handle lever I is to throw the pulley F in and out of gear when necessary. The pulley F runs loose on the shaft when out of gear. On the rear legs of the frame I attach a broad iron plate, K, to form a sliding face, similar to a sleigh, which supports the back part of the frame instead of wheels. The main driving-wheels G may be constructed to run loose on the axle, to be actuated by two clutches, if necessary.

What I claim as my invention, and desire to secure by Letters Patent, is—

The arrangement of the revolving circular saw C, adjusting-frame B, and lever D, in combination with the other attachments, in the manner herein described, as and for the purpose set forth.

GEORGE B. GRUMAN.

Witnesses:
WM. VINE,
JOSEPH F. FOOTE.